US012770182B2

(12) United States Patent
Uchimura et al.

(10) Patent No.: US 12,770,182 B2
(45) Date of Patent: Oct. 20, 2026

(54) DISPLAY CONTROL APPARATUS, DISPLAY CONTROL METHOD, AND NON-TRANSITORY COMPUTER-READABLE MEDIUM

(71) Applicant: NEC Corporation, Tokyo (JP)

(72) Inventors: Jun Uchimura, Tokyo (JP); Hiroki Sugegaya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 325 days.

(21) Appl. No.: 18/034,655

(22) PCT Filed: Nov. 11, 2020

(86) PCT No.: PCT/JP2020/042020

§ 371 (c)(1),
(2) Date: Apr. 28, 2023

(87) PCT Pub. No.: WO2022/102008

PCT Pub. Date: May 19, 2022

(65) Prior Publication Data

US 2023/0385895 A1 Nov. 30, 2023

(51) Int. Cl.
*G06Q 30/00* (2023.01)
*G06Q 30/0601* (2023.01)

(52) U.S. Cl.
CPC ..... *G06Q 30/0643* (2013.01); *G06Q 30/0623* (2013.01)

(58) Field of Classification Search
CPC . G06Q 30/0623; G06Q 30/0643; G06Q 30/02
See application file for complete search history.

(56) References Cited

U.S. PATENT DOCUMENTS 8,403,215 B2 * 3/2013 Aihara ................. G06K 7/1095 235/383
9,367,770 B2 * 6/2016 Footen ............. G06V 30/19173

(Continued)

FOREIGN PATENT DOCUMENTS

JP 2012-074014 A 4/2012
JP 2015-162217 A 9/2015

(Continued)

OTHER PUBLICATIONS

"Bringing Online Shopping Experience to Offline Retail through Augmented Reality and RFID," by Zulqarnain Rashid, Enric Peig and Rafael Pous, 2015 5th International Conference on the Internet of Things (IOT), 978-1-4673-8058-4/15, IEEE, 2015 (Year: 2015).*

(Continued)

*Primary Examiner* — Anne M Georgalas
(74) *Attorney, Agent, or Firm* — Sughrue Mion, PLLC

(57) ABSTRACT

A shelf information acquisition unit (122) acquires shelf identification information. The shelf identification information is information acquired by processing an image being generated by capturing an image of inside of a store and including a product shelf, and is information identifying the product shelf. A product identification information acquisition unit (130) acquires, from an identification information storage unit (160), a plurality of pieces of product identification information being related to the shelf identification information acquired by the shelf information acquisition unit (122). A display control unit (140) performs display processing for acquiring, from a product information storage unit (170), product information being related to the product identification information acquired by the product identification information acquisition unit (130), and causing a display unit (150) to display the product information.

17 Claims, 15 Drawing Sheets

(56) References Cited

U.S. PATENT DOCUMENTS

| | | | | |
|---|---|---|---|---|
| 9,659,204 | B2 * | 5/2017 | Wu | G06V 20/52 |
| 10,007,964 | B1 * | 6/2018 | Calhoon | H04N 7/185 |
| 10,963,658 | B1 * | 3/2021 | Bloch | G06V 10/42 |
| 2013/0147839 | A1 * | 6/2013 | Fukushima | G06Q 30/06 345/633 |
| 2013/0223673 | A1 * | 8/2013 | Davis | G06F 3/147 235/375 |
| 2016/0171707 | A1 * | 6/2016 | Schwartz | G06V 30/15 382/180 |
| 2016/0253746 | A1 * | 9/2016 | Morrison | G06Q 30/0625 705/26.62 |
| 2017/0337508 | A1 * | 11/2017 | Bogolea | G05D 1/0274 |
| 2019/0197561 | A1 * | 6/2019 | Adato | G06T 7/73 |
| 2019/0244436 | A1 * | 8/2019 | Stansell | G06F 3/011 |
| 2020/0226380 | A1 * | 7/2020 | Barras | G06Q 30/0623 |
| 2021/0374836 | A1 * | 12/2021 | Bronicki | G06Q 30/0208 |

FOREIGN PATENT DOCUMENTS

| | | | |
|---|---|---|---|
| JP | 2016-057684 | A | 4/2016 |
| JP | 2020-067814 | A | 4/2020 |
| WO | 2019/065212 | A1 | 4/2019 |

OTHER PUBLICATIONS

International Search Report for PCT Application No. PCT/JP2020/042020, mailed on Feb. 9, 2021.

Scandit, Augmented Reality Retail Price Label Verifying IOS, YouTube (Sep. 26, 2018), https://www.youtube.com/watch?v=WnlVq6LZmgk.

* cited by examiner

FIG. 3

160

| SHELF IDENTIFICATION INFORMATION | PRODUCT IDENTIFICATION INFORMATION |
|---|---|
| A001 | P001, P002··· |
| A002 | P010, P011··· |
| ⋮ | ⋮ |

FIG. 4

170

| PRODUCT IDENTIFICATION INFORMATION | PRODUCT INFORMATION | | |
|---|---|---|---|
| | PRODUCT NAME | PRICE | PRODUCT DESCRIPTION |
| P001 | ×× | 128 | ··· |
| P002 | △△ | 138 | ··· |
| ⋮ | ⋮ | ⋮ | ⋮ |

FIG. 12

200

| PRODUCT IDENTIFICATION INFORMATION |
| --- |
| × × (P001) |
| □□ (P010) |
| ⋮ |

| LANGUAGE INFORMATION (ATTRIBUTE INFORMATION) |
| --- |
| ENGLISH |

DISPLAY CONTROL APPARATUS, DISPLAY CONTROL METHOD, AND NON-TRANSITORY COMPUTER-READABLE MEDIUM

This application is a National Stage Entry of PCT/JP2020/042020 filed on Nov. 11, 2020, the contents of all of which are incorporated herein by reference, in their entirety.

TECHNICAL FIELD

The present invention relates to a display control apparatus, a display control method, and a program.

BACKGROUND ART

In a store, a product shelf is provided with a shelf label in order to allow a customer to recognize product information such as a product name and a price. On the other hand, in recent years, a customer often visits a store in a state of carrying a mobile terminal. Thus, it has been considered to, when a customer who visits a store carries a mobile terminal, cause the mobile terminal to display product information.

For example, Patent Document 1 discloses the following technique. First, a mobile terminal of a customer receives a shelf label code from a shelf label apparatus, and transmits the shelf label code to a server. Accordingly, the server transmits, to the mobile terminal, product information being related to the shelf label code received from the mobile terminal. Thereafter, the mobile terminal displays the product information received from the server.

Note that, Patent Document 2 describes that, when a purchaser inquires about an inventory status of a product or the like at a store, a mobile terminal reads identification information of an electronic shelf label, and transmits the read identification information to a server together with inquiry information of a product inventory.

RELATED DOCUMENT

Patent Document

Patent Document 1: Japanese Patent Application Publication No. 2015-162217

Patent Document 2: Japanese Patent Application Publication No. 2016-057684

SUMMARY OF THE INVENTION

Technical Problem

In general, it is difficult to enlarge a shelf label in a store. Thus, in order to check product information at the store, it is necessary to approach the shelf label. Thus, there arises a case where it is difficult for a customer to check product information. One example of an object of the present invention is to make it easy for a customer to check product information at a store.

Solution to Problem

The present invention provides a display control apparatus including: a shelf information acquisition unit that acquires shelf identification information which is information acquired by processing an image being generated by capturing an image of inside of a store and including a product shelf and which identifies the product shelf;

a product identification information acquisition unit that is connectable to an identification information storage unit storing each of a plurality of pieces of the shelf identification information in association with pieces of product identification information of a plurality of kinds of products, and acquires a plurality of pieces of the product identification information being related to the shelf identification information acquired by the shelf information acquisition unit; and a display control unit that is connectable to a product information storage unit storing each of a plurality of pieces of the product identification information in association with product information being information relating to the product being related to the product identification information, and performs processing for acquiring a plurality of pieces of the product information being related to the plurality of pieces of product identification information acquired by the product identification information acquisition unit and causing a display unit to display the plurality of pieces of the product information.

The present invention provides a display control method performed by a computer, the method including:

shelf information acquisition processing of acquiring shelf identification information which is information acquired by processing an image being generated by capturing an image of inside of a store and including a product shelf and which identifies the product shelf;

product identification information acquisition processing of being connectable to an identification information storage unit storing each of a plurality of pieces of the shelf identification information in association with pieces of product identification information of a plurality of kinds of products, and acquiring a plurality of pieces of the product identification information being related to the shelf identification information acquired in the shelf information acquisition processing; and display control processing of being connectable to a product information storage unit storing each of a plurality of pieces of the product identification information in association with product information being information relating to the product being related to the product identification information, and performing processing for acquiring a plurality of pieces of the product information being related to the plurality of pieces of product identification information acquired in the product identification information acquisition processing and causing a display unit to display the plurality of pieces of the product information.

The present invention provides a program causing a computer to include:

a shelf information acquisition function of acquiring shelf identification information which is information acquired by processing an image being generated by capturing an image of inside of a store and including a product shelf and which identifies the product shelf;

a product identification information acquisition function of being connectable to an identification information storage unit storing each of a plurality of pieces of the shelf identification information in association with pieces of product identification information of a plurality of kinds of products, and acquiring a plurality of pieces of the product identification information being related to the shelf identification information acquired in the shelf information acquisition function; and a display control function of being connectable to a product information storage unit storing each of a plurality of pieces of the product identification information in association with product information being information relating to the product being related to the product identification information, and performing processing for acquiring a plurality of pieces of the product information being related to the plurality of pieces of product identification information acquired in the product identification information acquisition function and causing a display unit to display the plurality of pieces of the product information.

Advantageous Effects of Invention

The present invention makes it easy for a customer to check product information in a store.

BRIEF DESCRIPTION OF THE DRAWINGS

The above-described object, other objects, features, and advantageous effects will become more apparent from a preferred example embodiment described below and the following accompanying drawings.

FIG. 3 is a diagram illustrating one example of information stored in an identification information storage unit.

FIG. 4 is a diagram illustrating one example of information stored in a product information storage unit.

FIG. 12 is a diagram illustrating one example of customer information stored in a customer information storage unit.

DESCRIPTION OF EMBODIMENTS

Hereinafter, example embodiments of the present invention are described by use of the drawings. Note that, in all of the drawings, a similar component is assigned with a similar reference sign, and description thereof is omitted, as appropriate.

First Example Embodiment

Figure 1:
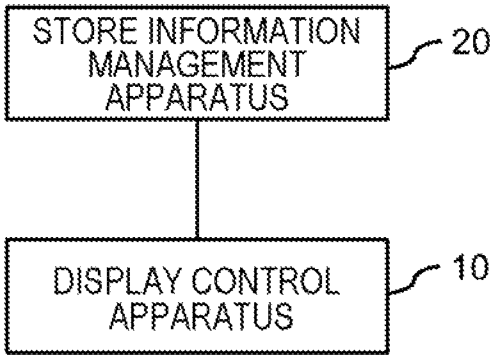
FIG. 1 is a diagram for describing a usage environment of a display control apparatus according to a first example embodiment.

FIG. 1 is a diagram for describing a usage environment of a display control apparatus 10 according to the present example embodiment. The display control apparatus 10 is used together with a store information management apparatus 20. The display control apparatus 10 allows a customer in a store to display, on a display unit, product information of a product near the customer. The product information includes, for example, a product name and a price.

In the example illustrated in the present figure, the display control apparatus 10 is a terminal carried by a customer. The store information management apparatus 20 stores information (hereinafter, referred to as product information) regarding each of a plurality of products sold in the store. The display control apparatus 10 previously acquires and stores the product information of each of the plurality of products from the store information management apparatus 20. Then, the display control apparatus 10 identifies a product near the customer, reads product information of the identified product, and causes a display unit of the display control apparatus 10 to display the read product information.

Note that, the display control apparatus 10 uses an image generated by the display control apparatus 10, when identifying a product near the customer. This image is generated by capturing an image of inside of the store, and includes a product shelf. Then, the display control apparatus 10 causes the display unit to display the product information of a product placed on the product shelf.

Note that, the store information management apparatus 20 stores, for each of a plurality of stores (i.e., for each piece of store identification information), information used by the display control apparatus 10 (e.g., information stored in an identification information storage unit 160 described later, and information stored in a product information storage unit 170 described later). Then, when acquiring the store identification information from the display control apparatus 10, the store information management apparatus 20 transmits, to the display control apparatus 10, information being related to the store identification information, and causes the identification information storage unit 160 and the product information storage unit 170 to store the transmitted information. The processing is performed, for example, before and after the customer carrying the display control apparatus 10 enters the store. Note that, the store identification information may be latitude/longitude information generated by use of a GPS.

Figure 2:
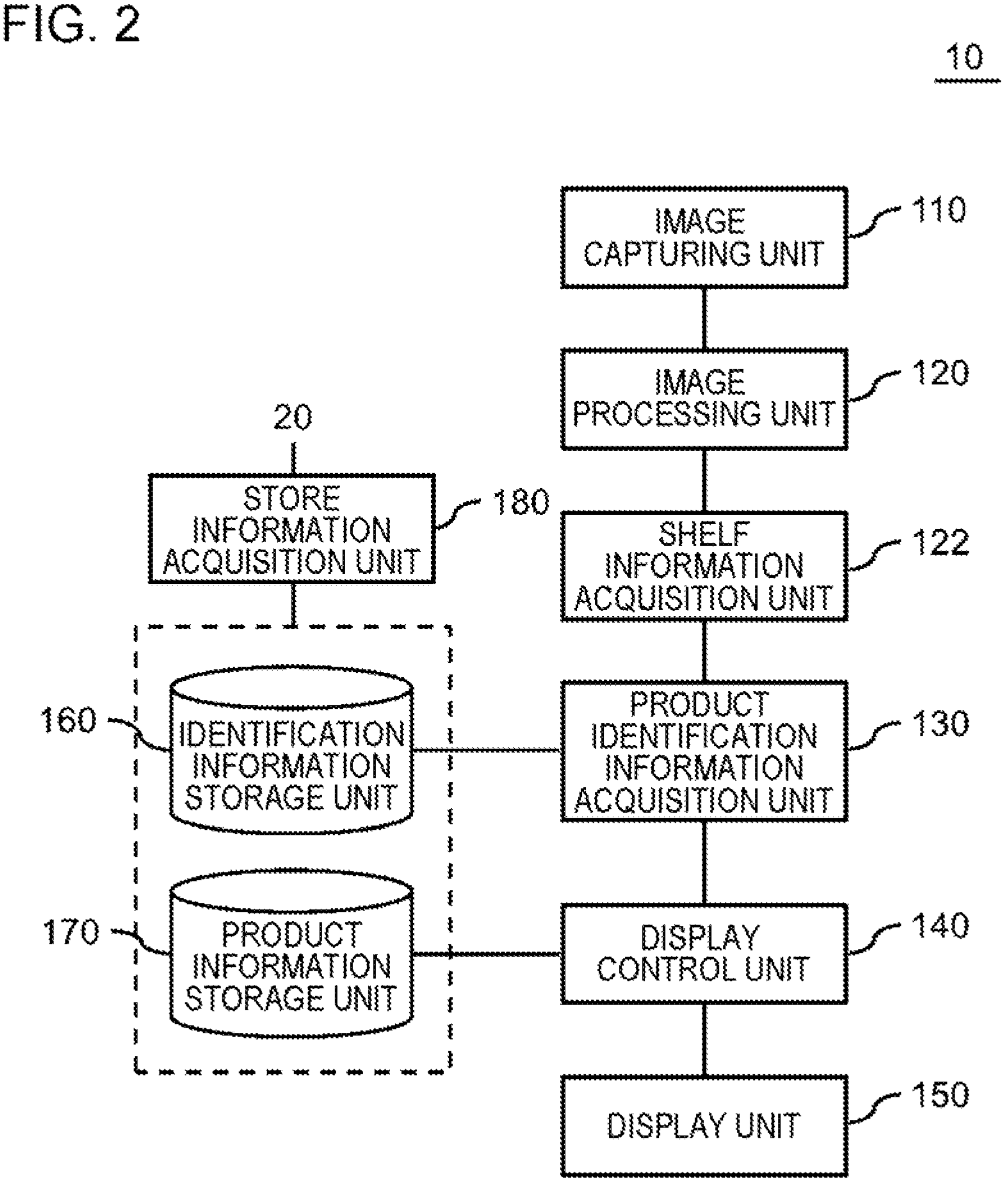
FIG. 2 is a diagram illustrating one example of a functional configuration of the display control apparatus.

FIG. 2 is a diagram illustrating one example of a functional configuration of the display control apparatus 10. The display control apparatus 10 includes a shelf information acquisition unit 122, a product identification information acquisition unit 130, and a display control unit 140.

The shelf information acquisition unit 122 acquires shelf identification information. The shelf identification information is information acquired by processing an image which is generated by capturing an image of inside of a store and which includes a product shelf, and is information for identifying the product shelf.

The product identification information acquisition unit 130 is connectable to the identification information storage unit 160. The identification information storage unit 160 stores each of a plurality of pieces of shelf identification information in association with pieces of product identification information of a plurality of kinds of products. The product identification information stored in the identification information storage unit 160 is related to a product placed on a product shelf being related to the shelf identification information. Then, a plurality of kinds of products are often placed on one product shelf. Thus, in the identification information storage unit 160, a plurality of pieces of product identification information are often associated with one piece of shelf identification information. Then, the product identification information acquisition unit 130 acquires, from the identification information storage unit 160, a plurality of pieces of product identification information being related to the shelf identification information acquired by the shelf information acquisition unit 122. However, when one piece of product identification information is associated with one piece of shelf identification information, the product identification information acquisition unit 130 reads one piece of product identification information.

The display control unit 140 is connectable to the product information storage unit 170. The product information storage unit 170 stores each of a plurality of pieces of product identification information in association with product information being related to the product identification information. Then, the display control unit 140 performs display processing for acquiring, from the product information storage unit 170, product information being related to the product identification information acquired by the product identification information acquisition unit 130, and causing a display unit 150 to display the product information. Note that, when the product identification information acquisition unit 130 has read a plurality of pieces of product identification information, the display control unit 140 acquires a plurality of pieces of product information being related to the plurality of pieces of product identification information, and performs display processing.

In the example illustrated in the present figure, the display unit 150, the identification information storage unit 160, and the product information storage unit 170 are a part of the display control apparatus 10.

The display unit 150 includes a display, and performs display on the display. One example of display performed herein is display of product information by the display control unit 140. The display included in the display unit 150 may be a touch panel.

Moreover, information stored in the identification information storage unit 160 and information stored in the product information storage unit 170 is updated by a store information acquisition unit 180. When detecting, for example, that a terminal to be the display control apparatus 10 has entered a store, the store information acquisition unit 180 acquires store identification information of the store, and transmits the store identification information to the store information management apparatus 20. Then, the store information acquisition unit 180 stores, in the identification information storage unit 160 and the product information storage unit 170, the information acquired from the store information management apparatus 20.

Note that, at least one of the identification information storage unit 160 and the product information storage unit 170 may be located outside the display control apparatus 10.

Moreover, in the example illustrated in the present figure, the display control apparatus 10 includes an image capturing unit 110 and an image processing unit 120.

The image capturing unit 110 captures an image of inside of a store according to, for example, an operation of a customer. The image capturing unit 110 may generate a still image, or may generate a moving image. In the latter case, a frame rate of an image generated by the image capturing unit 110 is any frame rate.

The image processing unit 120 generates shelf identification information by processing an image generated by the image capturing unit 110. For example, the image processing unit 120 processes a region of an image being relevant to a product shelf, detects a marker included in the region, and generates shelf identification information being related to the marker. The marker may be a code (e.g., a bar code or a two-dimensional code), may be a design, a character, and a pattern on a specific region of a product shelf, or may be a mark being relevant to a so-called electronic watermark.

Note that, the image processing unit 120 also generates another piece of information as needed.

FIG. 3 is a diagram illustrating one example of information stored in the identification information storage unit 160. As described above, the identification information storage unit 160 stores each of a plurality of pieces of shelf identification information in association with at least one piece of product identification information. The product identification information stored in the identification information storage unit 160 is related to a product placed on a product shelf being related to the shelf identification information.

FIG. 4 is a diagram illustrating one example of information stored in the product information storage unit 170. As described above, the product information storage unit 170 stores product identification information in association with product information of a product being related to the product identification information. The product information includes, for example, a product name, a price, and description information of the product.

Figure 5:
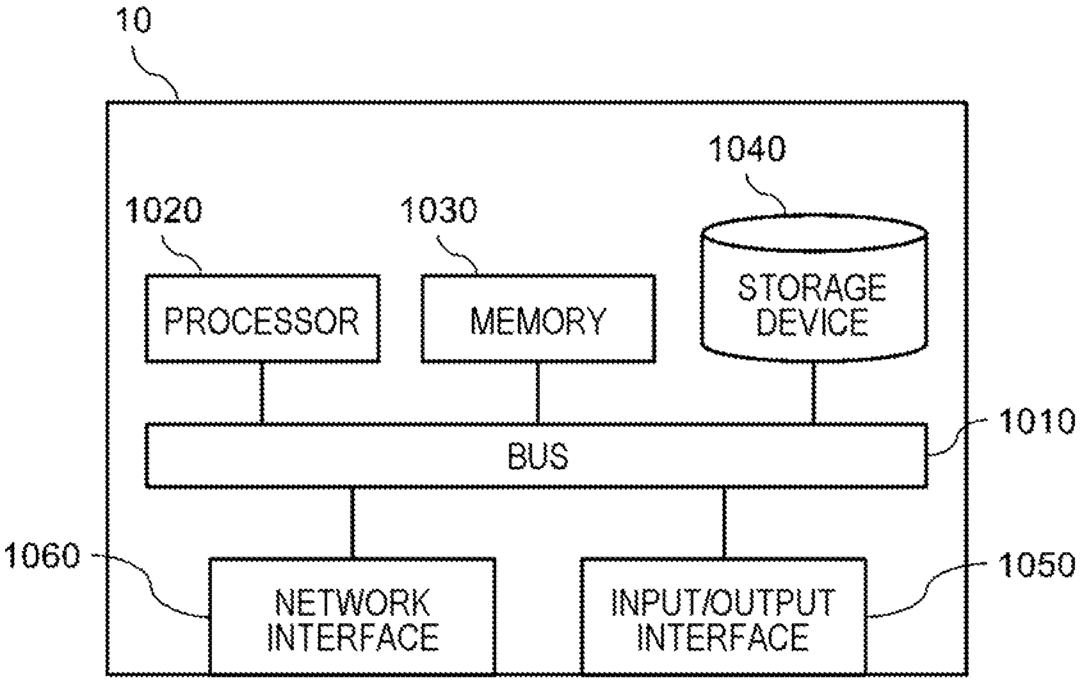
FIG. 5 is a diagram illustrating a hardware configuration example of the display control apparatus

FIG. 5 is a diagram illustrating a hardware configuration example of the display control apparatus 10. The display control apparatus 10 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit/receive data to/from one another. However, a method of mutually connecting the processor 1020 and the like is not limited to bus connection.

The processor 1020 is a processor achieved by a central processing unit (CPU), a graphics processing unit (GPU), or the like.

The memory 1030 is a main storage achieved by a random access memory (RAM) or the like.

The storage device 1040 is an auxiliary storage achieved by a hard disk drive (HDD), a solid state drive (SSD), a memory card, a read only memory (ROM), or the like. The storage device 1040 stores a program module for achieving each function (e.g., the image processing unit 120, the product identification information acquisition unit 130, the display control unit 140, and the store information acquisition unit 180) of the display control apparatus 10. The processor 1020 reads each of the program modules onto the memory 1030, executes the read program module, and thereby achieves each function being related to the program module. Moreover, the storage device 1040 also functions as the identification information storage unit 160 and the product information storage unit 170.

The input/output interface 1050 is an interface for connecting the display control apparatus 10 and various pieces of input/output equipment with each other. The input/output interface 1050 is connected to, for example, a display included in the display unit 150.

The network interface 1060 is an interface for connecting the display control apparatus 10 to a network. The network is, for example, a local area network (LAN) or a wide area network (WAN). A method of connecting the network interface 1060 to the network may be wireless connection or may be wired connection. The display control apparatus 10 communicates with the store information management apparatus 20 via, for example, the network interface 1060.

Figure 6:
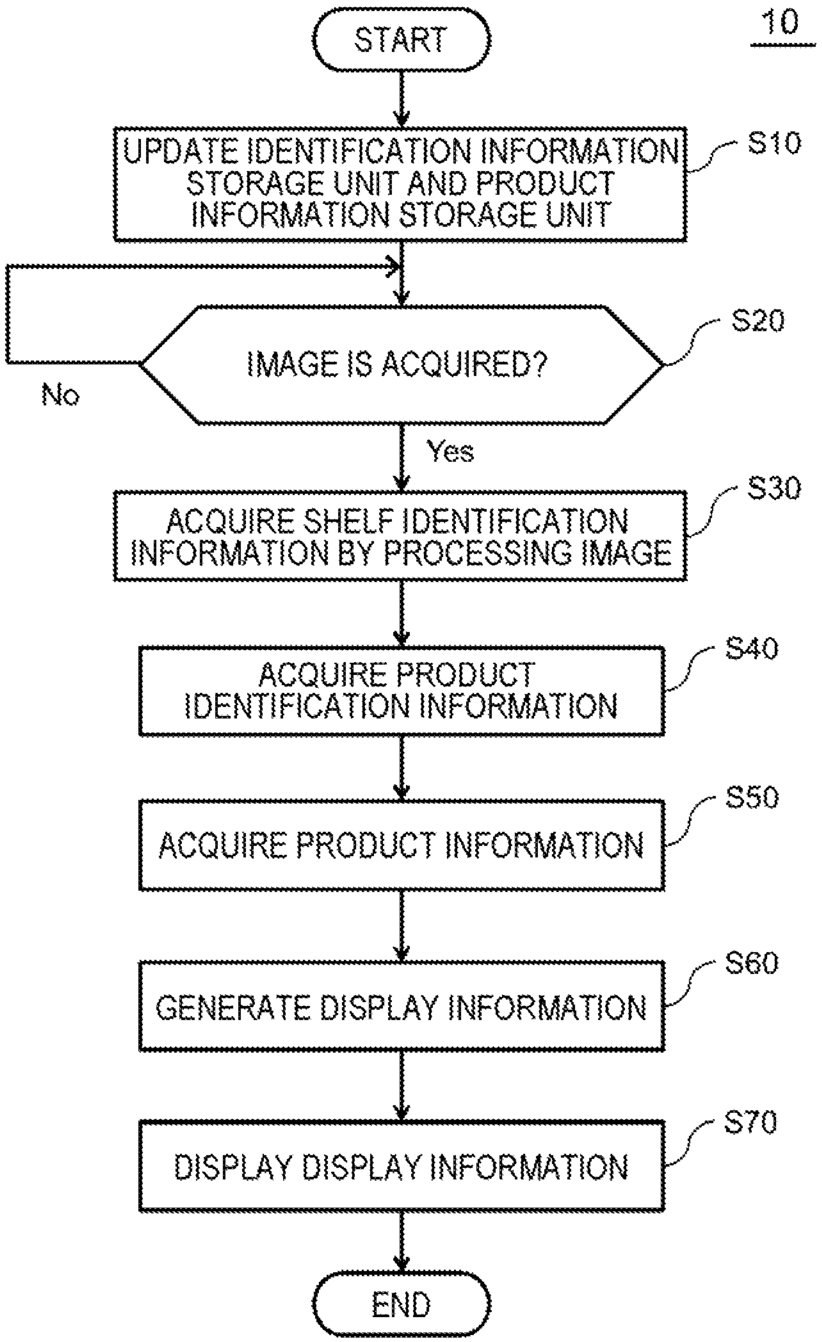
FIG. 6 is a flowchart illustrating a first example of processing performed by the display control apparatus.

FIG. 6 is a flowchart illustrating a first example of processing performed by the display control apparatus 10. First, when a customer carrying the display control apparatus 10 enters a store, the store information acquisition unit 180 of the display control apparatus 10 acquires store identification information of the store. The store identification information is, for example, latitude/longitude information indicating a position of the display control apparatus 10 as described above, but may be information (e.g., a beacon) acquired from a transmitter installed at an entrance of a store. Accordingly, the store information acquisition unit 180 transmits the store identification information to the store information management apparatus 20, acquires, from the store information management apparatus 20, information being related to the store identification information, and causes the identification information storage unit 160 and the product information storage unit 170 to store the acquired information (step S10).

The customer who has entered the store operates the display control apparatus 10, and causes the image capturing unit 110 to capture an image of inside of the store. The image processing unit 120 processes an image generated by the image capturing unit 110, and determines whether the image includes a marker of a product shelf (step S20). When the marker is included (step S20: Yes), the image processing unit 120 acquires shelf identification information by processing the marker. For example, the image processing unit 120 may generate shelf identification information by processing code information as a marker. Moreover, the image processing unit 120 may convert the marker into shelf identification information by use of a database associating a marker with shelf identification information (step S30). In the latter case, the display control apparatus 10 stores the database.

Next, the product identification information acquisition unit 130 reads, from the identification information storage unit 160, product identification information being related to the shelf identification information acquired in step S30 (step S40). Product identification information read in the processing may be a plurality of pieces of product identification information, or may be one piece of product identification information.

Then, the display control unit 140 reads, from the product information storage unit 170, product information being related to the product identification information acquired in step S40 (step S50). Then, the display control unit 140 generates, by use of the read product information, display information indicating a screen that the display unit 150 is caused to display (step S60), and outputs the generated display information to the display unit 150. The display unit 150 displays the screen according to the display information acquired from the display control unit 140 (step S70).

Figure 7:
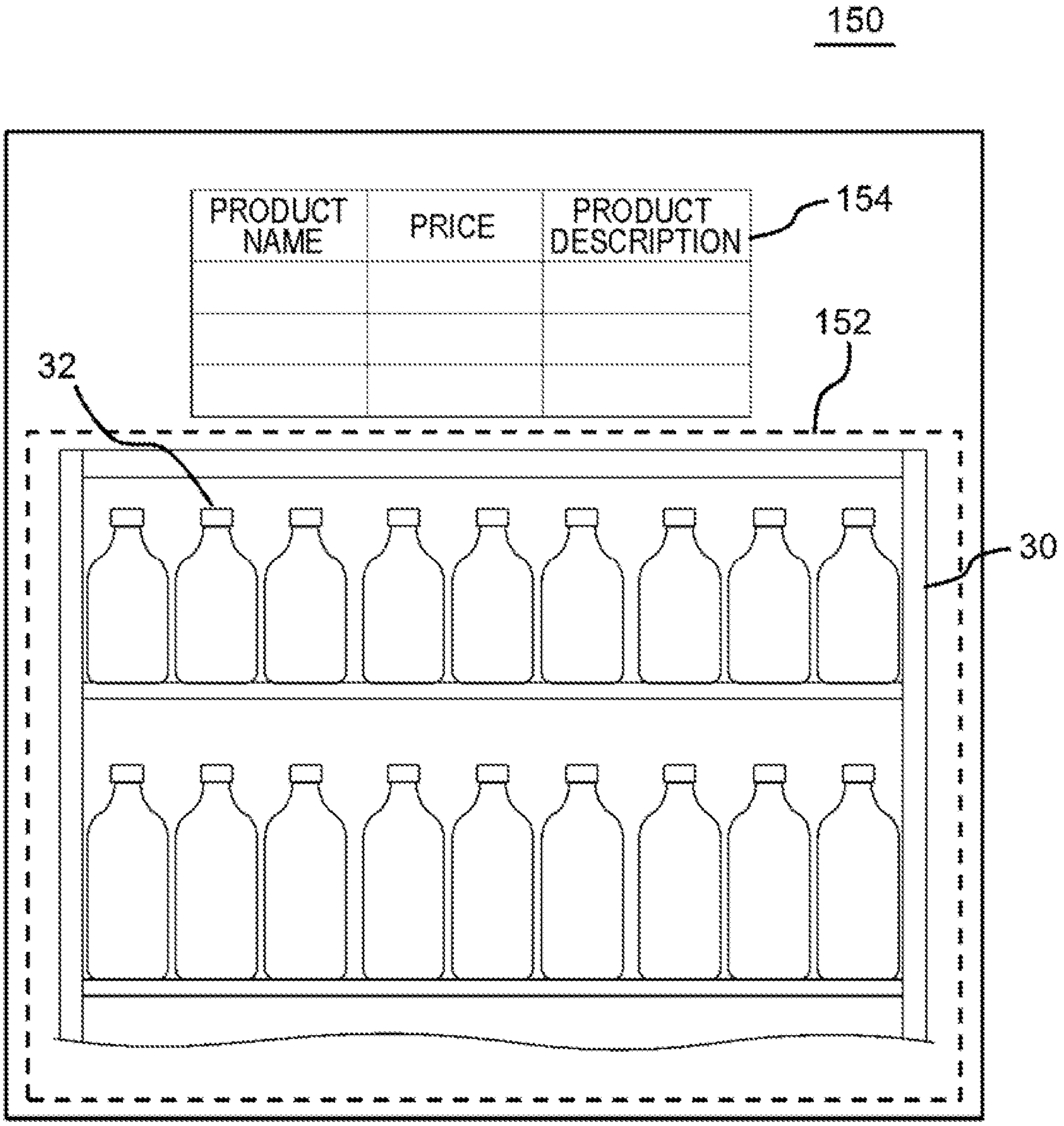
FIG. 7 is a diagram illustrating one example of a screen displayed in step S70 in FIG. 6.

FIG. 7 is a diagram illustrating one example of a screen displayed in step S70 in FIG. 6. In the example illustrated in the present figure, the display unit 150 displays, in separate regions, an image 152 targeted for processing in step S20, and a region (a product information display region 154) for displaying the product information read in step S50. The image 152 includes a product shelf 30, and a product 32 placed on the product shelf 30. In the example illustrated in the present figure, a plurality of pieces of product information are displayed in the one product information display region 154.

Figure 8:
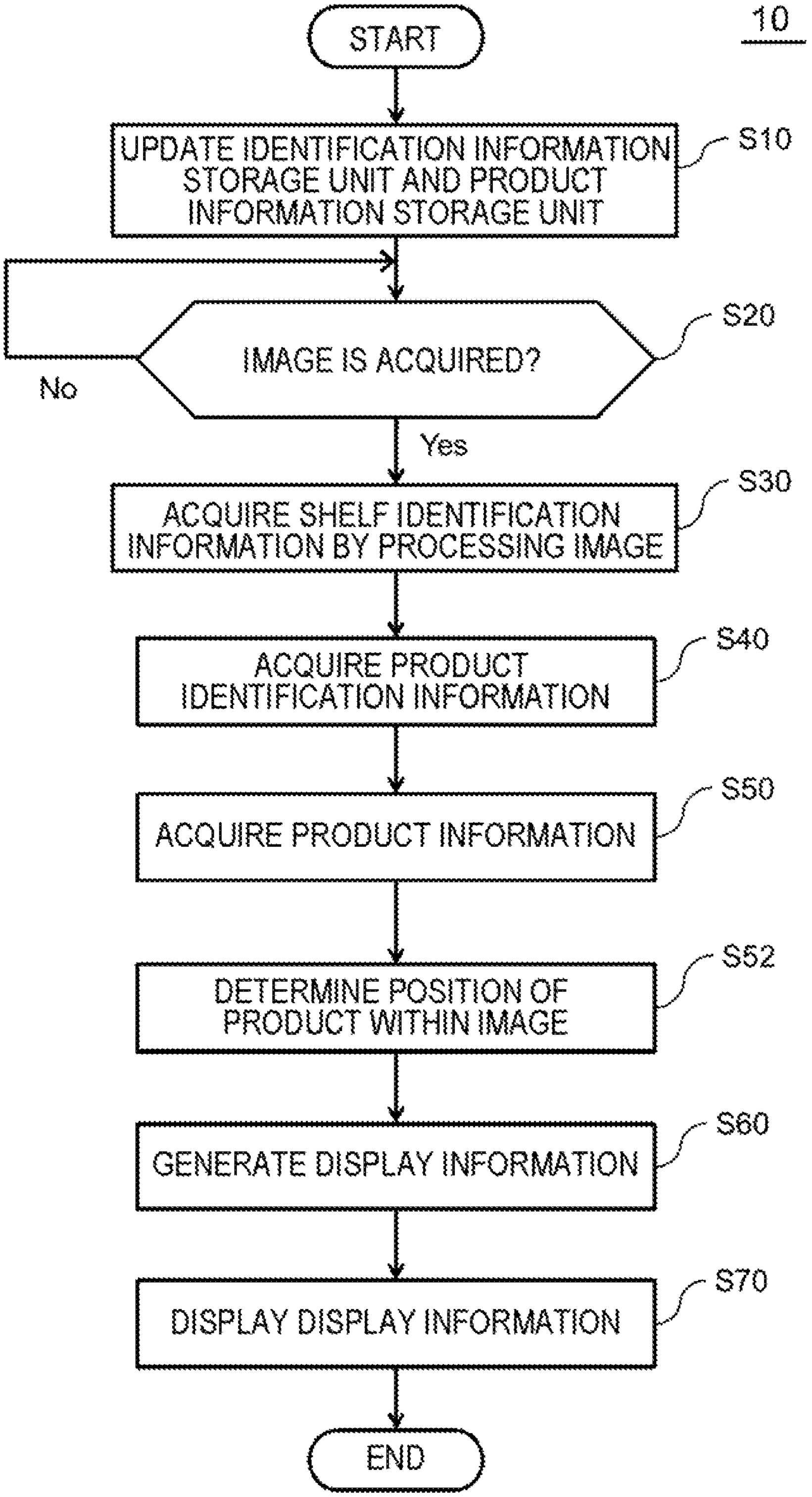
FIG. 8 is a flowchart illustrating a second example of processing performed by the display control apparatus.

FIG. 8 is a flowchart illustrating a second example of processing performed by the display control apparatus 10. In the example illustrated in the present figure, the image processing unit 120 of the display control apparatus 10 detects a position of a product on a product shelf, and determines, by use of the position, a position on a screen where product information should be displayed.

First, the display control apparatus 10 performs pieces of processing illustrated in steps S10 to S50. The pieces of processing are as described by use of FIG. 6.

After the display control unit 140 acquires product information (step S50), the image processing unit 120 processes an image, determines a position of a product within the image, and generates information indicating the position (hereinafter, referred to as position information) (step S52). The determination is performed, for example, by use of a feature value previously prepared for each product. The feature value is stored in, for example, the product information storage unit 170, and read by the image processing unit 120 in step S52.

Then, the display control unit 140 generates display information by use of the product information acquired in step S50 and the position information for each product generated in step S52 (step S60), and outputs the generated display information to the display unit 150. Herein, the display control unit 140 determines a position of the product information within the image by use of position information of a product being related to the product information. The display unit 150 displays a screen according to the display information acquired from the display control unit 140 (step S70).

Note that, the image processing unit 120 may perform, in step S30, the processing illustrated in step S52.

Figure 9:
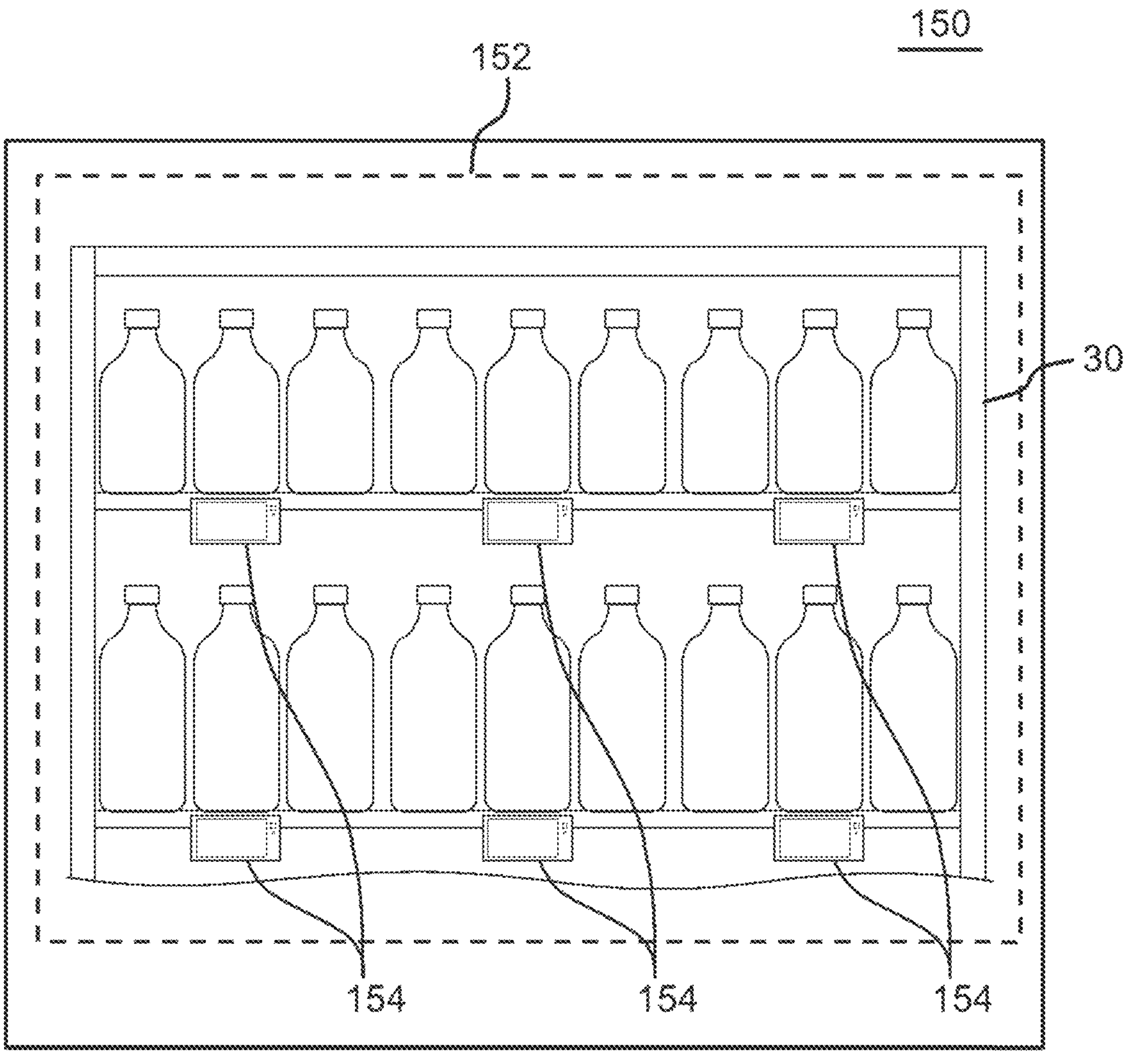
FIG. 9 is a diagram illustrating one example of a screen displayed in step S70 in FIG. 8.

FIG. 9 is a diagram illustrating one example of a screen displayed in step S70 in FIG. 8. In the example illustrated in the present figure, a position of the product information display region 154 is determined for each piece of product information. Then, the product information display region 154 is set in the image 152 near a product being related to the product information (e.g., a portion to which a shelf label of a product shelf is attached) or at a position overlapping the product.

As above, according to the present example embodiment, a customer in a store captures an image of a product shelf by use of the display control apparatus 10. Accordingly, the display control apparatus 10 displays, on the display unit 150, product information of a product placed on the product shelf. Therefore, it is easy for the customer to check the product information. For example, a shelf label is often provided on a product shelf.

However, since there is an upper limit to a size of the shelf label, it may be difficult to visually recognize information (e.g., a character) of the shelf label depending on a position of the shelf label. On the contrary, according to the present example embodiment, product information described on a shelf label is displayed on the display unit 150 of the display control apparatus 10. Thus, even when a shelf label is at a position where it is difficult to visually recognize the shelf label, it is easy for a customer to check the product information.

Second Example Embodiment

Figure 10:
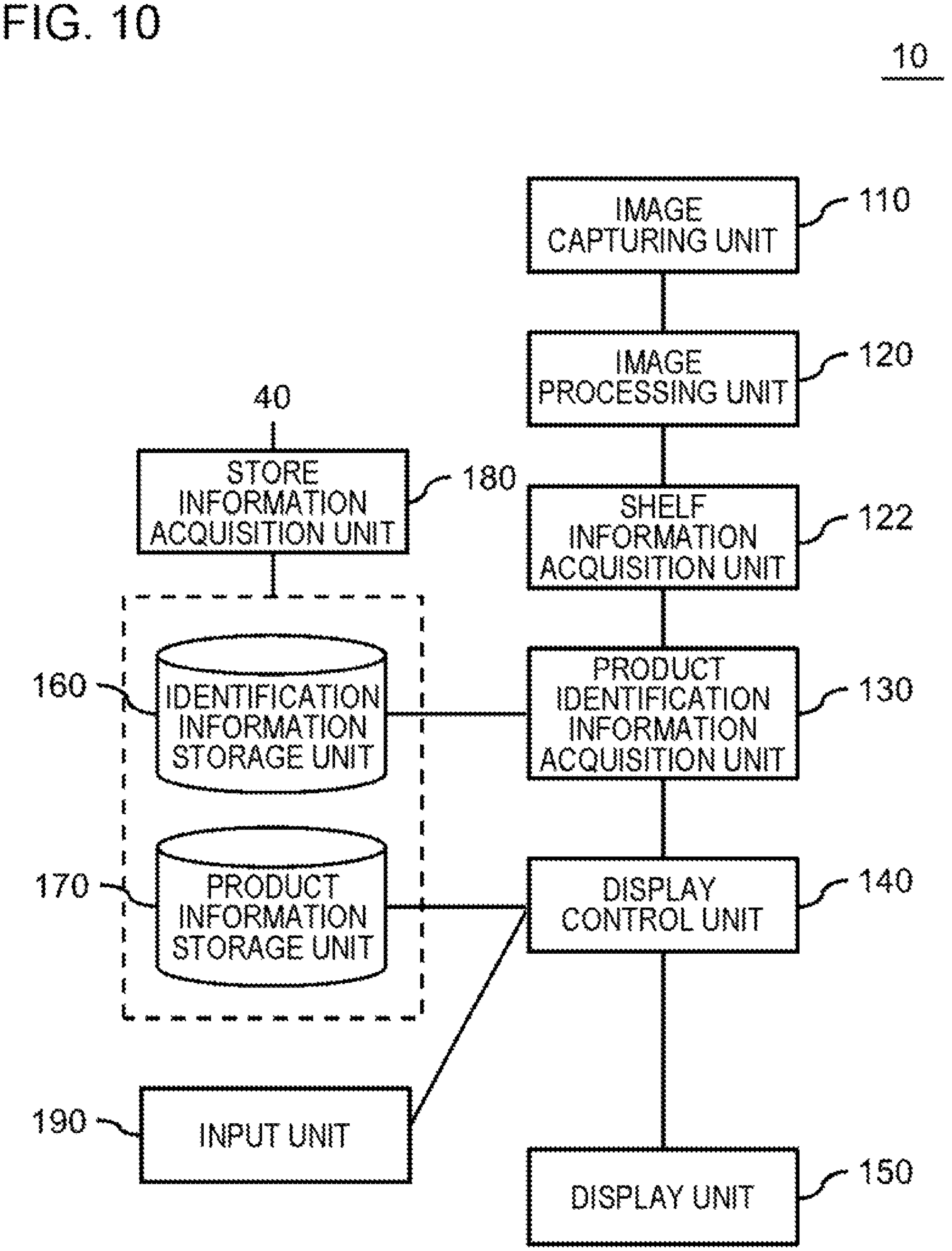
FIG. 10 is a diagram illustrating one example of a functional configuration of a display control apparatus according to a second example embodiment.

FIG. 10 is a diagram illustrating one example of a functional configuration of a display control apparatus 10 according to the present example embodiment. The display control apparatus 10 illustrated in the present figure is similar to the display control apparatus 10 illustrated in FIG. 2, except for the following point.

First, the display control apparatus 10 includes an input unit 190. The input unit 190 acquires information input by a customer to the display control apparatus 10 via, for example, an input device such as a touch panel included in a display unit 150. The input information includes, for example, control information for a display screen of the display unit 150. Then, a display control unit 140 changes a display mode of product information in the display unit 150 by use of the input information.

As one example, after the display unit 150 displays product information, a customer sees the product information. Then, the customer performs an input to the input unit 190. The input is, for example, an input for enlarging or reducing a product information display region 154, and changing a language of a character displayed in the product information display region 154. According to the input, the display unit 150 enlarges or reduces the product information display region 154, or changes a language used in the product information display region 154.

In the present example embodiment as well, similarly to the first example embodiment, it is easy for a customer to check product information. Moreover, after the display unit 150 displays the product information, the display control unit 140 changes a display mode (e.g., a size of a display region and a language to be used) of the product information according to an input from a customer. Therefore, it is easier for a customer to check the product information.

Third Example Embodiment

Figure 11:
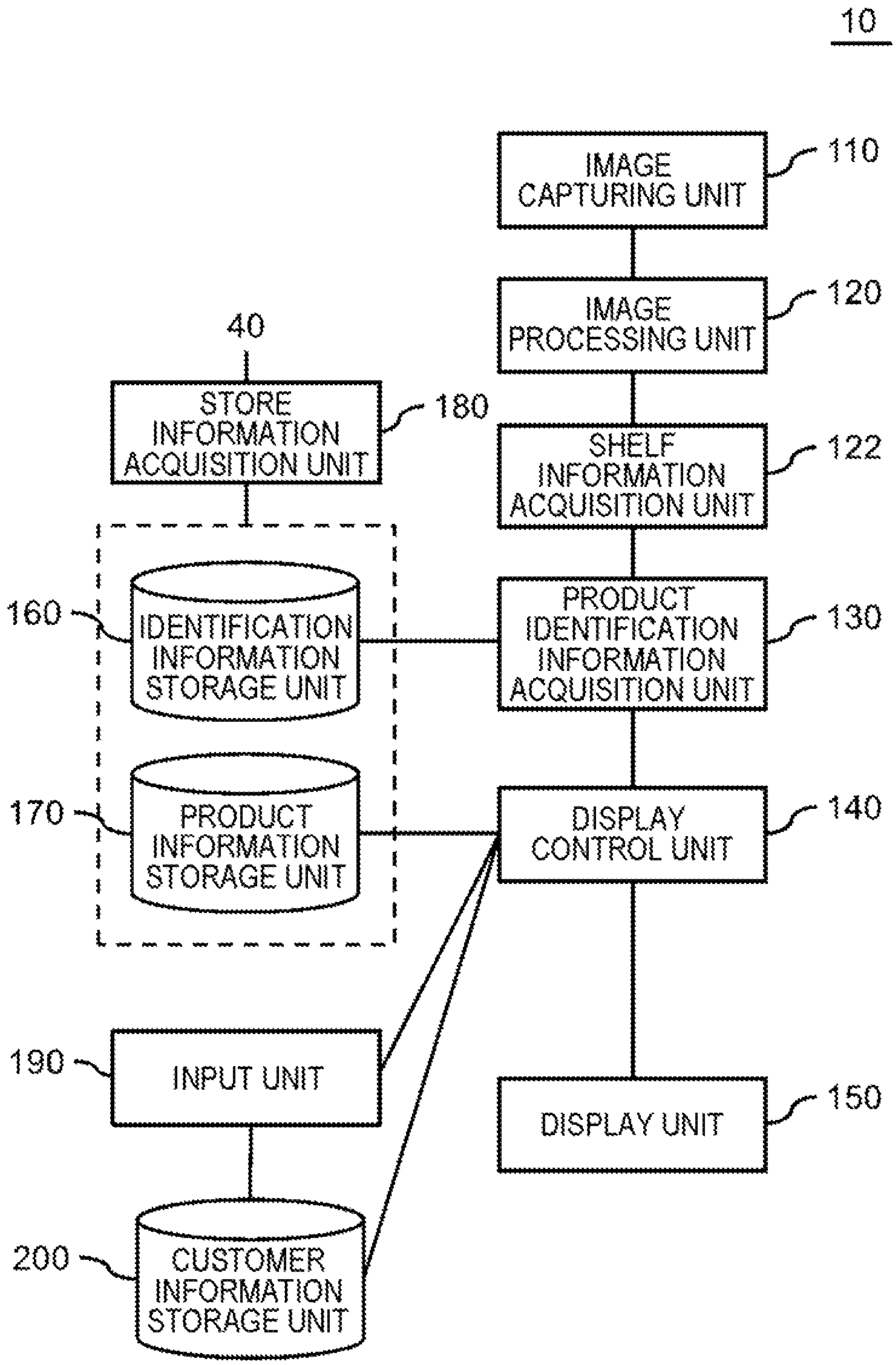
FIG. 11 is a diagram illustrating one example of a functional configuration of a display control apparatus according to a third example embodiment.

FIG. 11 is a diagram illustrating one example of a functional configuration of a display control apparatus 10 according to the present example embodiment. The display control apparatus 10 illustrated in the present figure is similar to the display control apparatus 10 illustrated in FIG. 10 except for the following point.

The display control apparatus 10 includes a customer information storage unit 200. The customer information storage unit 200 stores information (hereinafter, referred to as customer information) on a customer operating the display control apparatus 10. Then, a display control unit 140 changes a display mode of product information by use of the customer information. Note that, at least a part of the customer information may be input by an input unit 190. In this case, at least a part of the customer information stored in the customer information storage unit 200 is updated according to an input from the input unit 190.

FIG. 12 is a diagram illustrating one example of customer information stored in the customer information storage unit 200. In the example illustrated in the present figure, the customer information storage unit 200 stores product identification information as customer information. The product identification information indicates, for example, at least one of a product that a customer wishes to purchase and a product that matches a taste of the customer. Herein, the product identification information of a product that a customer wishes to purchase is determined based on information (e.g., a product name) input by the customer via, for example, the input unit 190. Moreover, a product that matches a taste of a customer is generated by use of, for example, a purchase history of the customer. Processing using the purchase history may be performed by the display control apparatus 10, or may be performed by an external apparatus.

Then, when product identification information acquired by a product identification information acquisition unit 130 includes product identification information stored in the customer information storage unit 200, the display control unit 140 causes a display unit 150 to display product information being related to the product identification information, in a mode (e.g., a mode easy to recognize, i.e., highlighting) differing from another piece of product information. One example of highlighting is, for example, enlarging a product information display region 154, thickening a frame of the product information display region 154, causing at least a color of one of the frame, a background, and a character to differ, or the like.

Moreover, when product identification information acquired by the product identification information acquisition unit 130 includes product identification information stored in the customer information storage unit 200, the display control unit 140 may cause the display unit 150 to display only product information being related to the product identification information, and may cause the display unit 150 not to display product information being related to another piece of product identification information.

Moreover, the customer information storage unit 200 may store attribute information of a customer. The attribute information includes, for example, information that can determine a language to be used by a customer. The information may be nationality information, or may be information that determines a language set in the display control apparatus 10. Then, the display control unit 140 changes a display mode of the product information display region 154 by use of the attribute information. For example, the display control unit 140 displays a character in the product information display region 154 by use of a language indicated by the attribute information.

In the present example embodiment as well, similarly to the second example embodiment, it is easy for a customer to check product information. Moreover, a display mode of product information on the display unit 150 is changed by use of at least one of information input by a customer to the display control apparatus 10, and customer information. Therefore, it is easier for a customer to check the product information.

Fourth Example Embodiment

Figure 13:
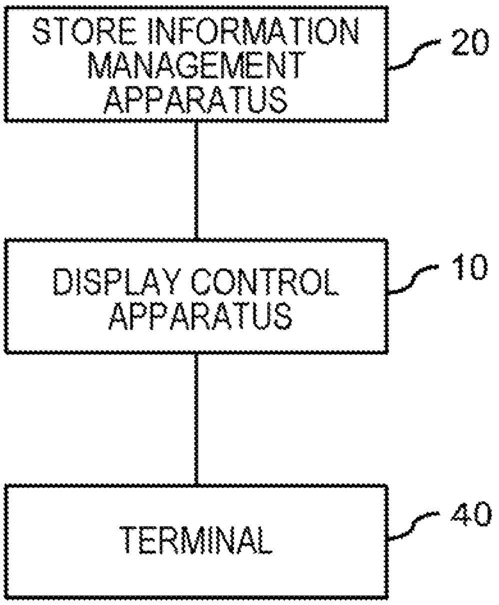
FIG. 13 is a diagram for describing a usage environment of a display control apparatus according to a fourth example embodiment.

FIG. 13 is a diagram for describing a usage environment of a display control apparatus 10 according to the present example embodiment. In the present example embodiment, the display control apparatus 10 has a configuration similar to that of the display control apparatus 10 according to any one of the above-described example embodiments, except that the display control apparatus 10 is an apparatus differing from a terminal 40 carried by a customer. The display control apparatus 10 is, for example, a server, and communicates with a store information management apparatus 20 and the terminal 40 of a customer. Then, the display control apparatus 10 causes the terminal 40 to display product information.

Figure 14:
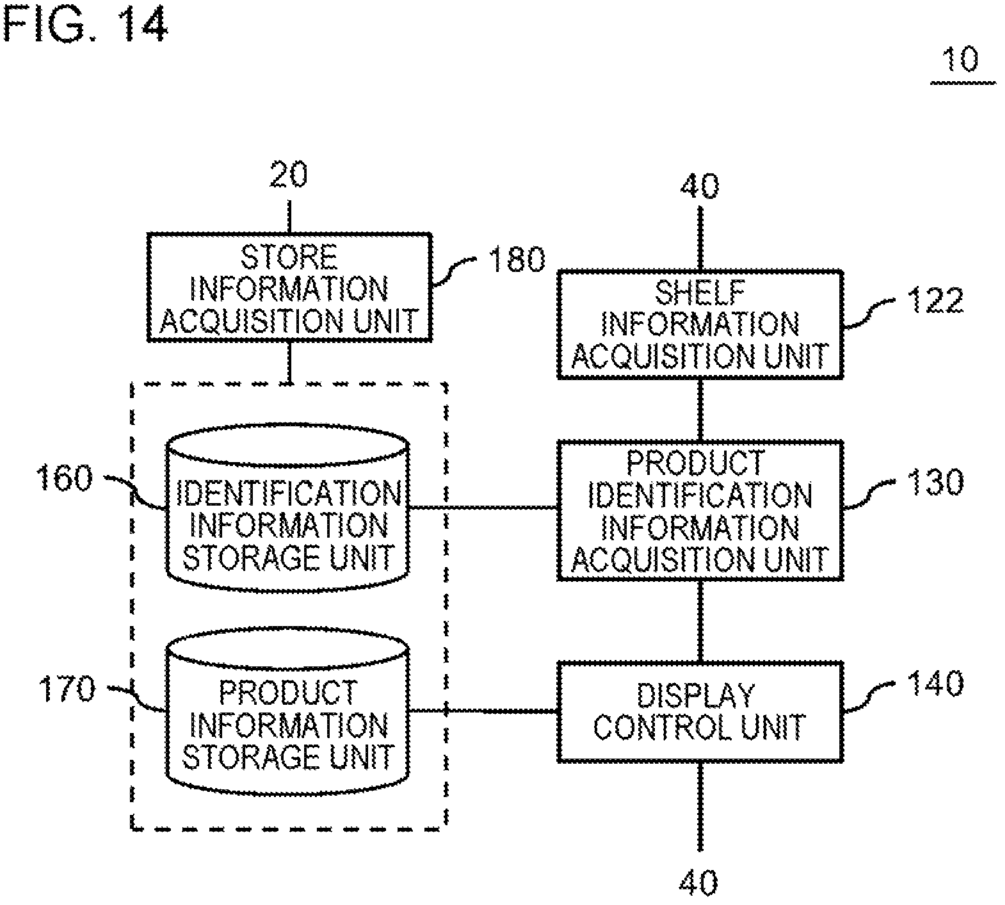
FIG. 14 is a diagram illustrating one example of a functional configuration of the display control apparatus illustrated in FIG. 13.

FIG. 14 is a diagram illustrating one example of a functional configuration of the display control apparatus 10 illustrated in FIG. 13. In the example illustrated in the present figure, the display control apparatus 10 includes a shelf information acquisition unit 122, a product identification information acquisition unit 130, a display control unit 140, an identification information storage unit 160, a product information storage unit 170, and a store information acquisition unit 180, but does not include an image capturing unit 110, an image processing unit 120, or a display unit 150 illustrated in FIG. 2 or the like. Configurations and functions of the product identification information acquisition unit 130, the display control unit 140, the identification information storage unit 160, the product information storage unit 170, and the store information acquisition unit 180 are similar to those according to each of the above-described example embodiments. Then, the display control unit 140 outputs display information to the terminal 40. Note that, the display control apparatus 10 may further include a customer information storage unit 200 illustrated in FIG. 11.

Figure 15:
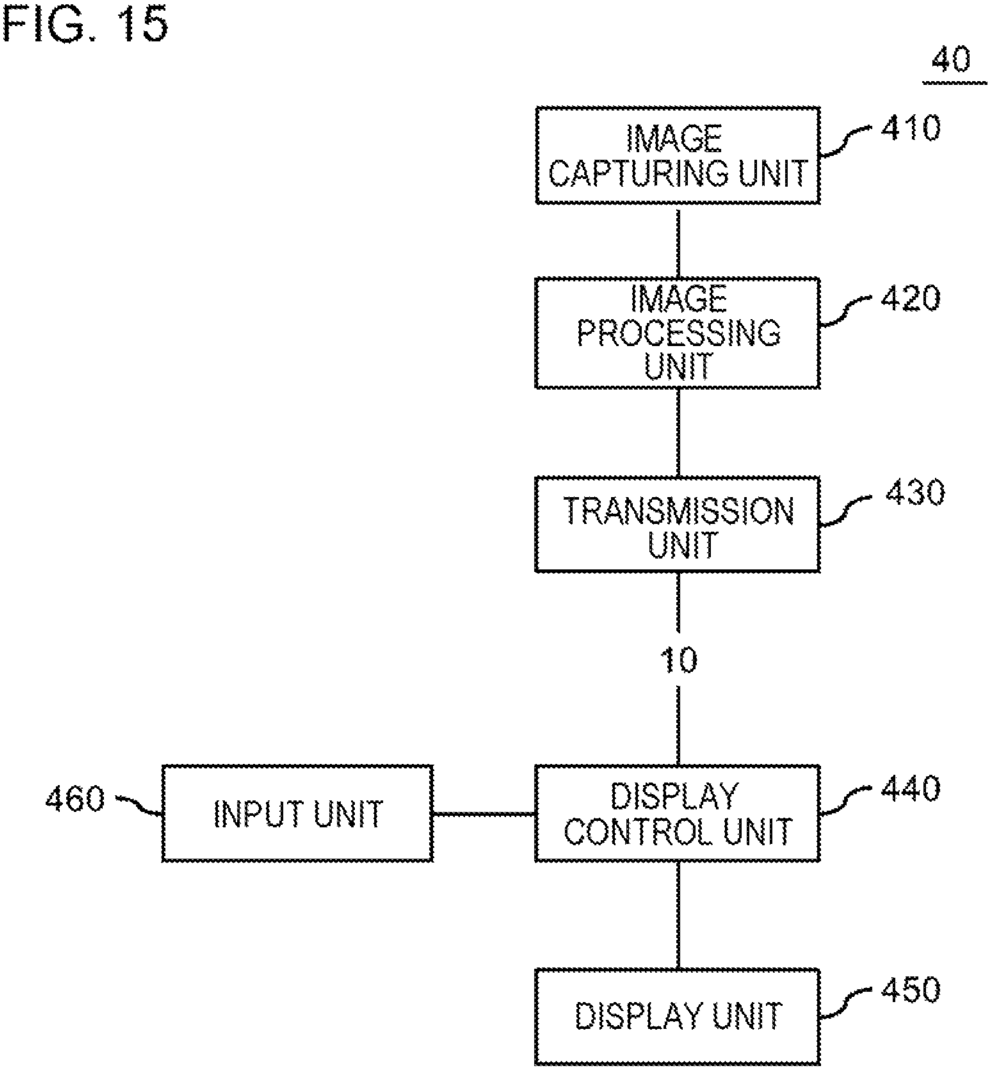
FIG. 15 is a diagram illustrating one example of a functional configuration of a terminal illustrated in FIG. 13.

FIG. 15 is a diagram illustrating one example of a functional configuration of the terminal 40 illustrated in FIG. 13. In the example illustrated in the present figure, the terminal 40 includes an image capturing unit 410, an image processing unit 420, a transmission unit 430, a display control unit 440, a display unit 450, and an input unit 460.

Configurations and functions of the image capturing unit 410, the image processing unit 420, the display unit 450, and the input unit 460 are similar to those of the image capturing unit 110, the image processing unit 120, the display unit 150, and an input unit 190 illustrated in each of the above-described example embodiments.

The transmission unit 430 transmits a processing result made by the image processing unit 420 to the product identification information acquisition unit 130 of the display control apparatus 10.

Then, the display control unit 440 causes the display unit 450 to perform display according to display information acquired from the display control apparatus 10. Moreover, the display control unit 440 changes a display mode of product information on the display unit 450 according to information input from the input unit 460. A specific example of the change is as described in the third example embodiment.

According to the present example embodiment as well, similarly to each of the above-described example embodiments, it is easy for a customer to check product information. Note that, in the present example embodiment, the image processing unit 120 may be provided in the display control apparatus 10 without providing the image processing unit 420 in the terminal 40. In this case, the transmission unit 430 of the terminal 40 transmits, to the image processing unit 120 of the display control apparatus 10, an image generated by the image capturing unit 410.

Although the example embodiments of the present invention have been described above with reference to the drawings, the example embodiments are exemplifications of the present invention, and various configurations other than the above can also be adopted.

Moreover, although a plurality of steps (pieces of processing) are described in order in a plurality of flowcharts used in the above description, an execution order of steps executed in each example embodiment is not limited to the described order. In each example embodiment, an order of illustrated steps can be changed to an extent that causes no problem in terms of content. Moreover, each of the example embodiments described above can be combined to an extent that content does not contradict.

Some or all of the above-described example embodiments can also be described as, but are not limited to, the following supplementary notes.

1. A display control apparatus including:
   - a shelf information acquisition unit that acquires shelf identification information which is information acquired by processing an image being generated by capturing an image of inside of a store and including a product shelf and which identifies the product shelf;
   - a product identification information acquisition unit that is connectable to an identification information storage unit storing each of a plurality of pieces of the shelf identification information in association with pieces of product identification information of a plurality of kinds of products, and acquires a plurality of pieces of the product identification information being related to the shelf identification information acquired by the shelf information acquisition unit; and
   - a display control unit that is connectable to a product information storage unit storing each of a plurality of pieces of the product identification information in association with product information being information relating to the product being related to the product identification information, and performs processing for acquiring a plurality of pieces of the product information being related to the plurality of pieces of product identification information acquired by the product identification information acquisition unit, and causing a display unit to display the plurality of pieces of the product information.
2. The display control apparatus according to supplementary note 1, in which
   - the display control unit
     - causes the display unit to display the plurality of pieces of product information together with the image, and
     - sets display positions of the plurality of pieces of product information within the image by use of positions, within the image, of the products being related to the pieces of product information.
3. The display control apparatus according to supplementary note 1 or 2, in which
   - the display control apparatus is a terminal carried by a customer, and
   - the terminal includes
     - an image generation unit that generates the image,
     - an image processing unit that processes the image and generates the shelf identification information, and
     - the display unit.
4. The display control apparatus according to supplementary note 3, further including
   - at least one of the identification information storage unit and the product information storage unit.
5. The display control apparatus according to supplementary note 1 or 2, in which
   - the shelf information acquisition unit acquires the shelf identification information from a terminal owned by a customer, and
   - the display control unit outputs the plurality of product information to the terminal.
6. The display control apparatus according to any one of supplementary notes 1 to 5, in which
   - the display control unit changes a display mode of the product information on the display unit, by use of information input by a customer in the store or information of the customer.
7. The display control apparatus according to supplementary note 6, in which
   - the display mode includes a size of a display region in which the product information is displayed, and a kind of language used for display of the product information.
8. The display control apparatus according to any one of supplementary notes 1 to 7, in which
   - the display unit is included in a terminal of a customer in the store, and
   - the display control unit selects, from among the plurality of pieces of product identification information acquired by the product identification information acquisition unit, at least one of the product identification information for which the product information should be highlighted, and the product identification information for which the product information is not displayed on the terminal, by use of information input by the customer to the terminal or information of the customer.

9. A display control method including, performing by a computer:

shelf information acquisition processing of acquiring shelf identification information which is information acquired by processing an image being generated by capturing an image of inside of a store and including a product shelf and which identifies the product shelf;

product identification information acquisition processing of being connectable to an identification information storage unit storing each of a plurality of pieces of the shelf identification information in association with pieces of product identification information of a plurality of kinds of products, and acquiring a plurality of pieces of the product identification information being related to the shelf identification information acquired in the shelf information acquisition processing; and display control processing of being connectable to a product information storage unit storing each of a plurality of pieces of the product identification information in association with product information being information relating to the product being related to the product identification information, and performing processing for acquiring a plurality of pieces of the product information being related to the plurality of pieces of product identification information acquired in the product identification information acquisition processing and causing a display unit to display the plurality of pieces of the product information.

10. The display control method performed by the computer according to supplementary note 9, in which the display unit is caused to display the plurality of pieces of product information together with the image; and display positions of the plurality of pieces of product information within the image are set by use of positions, within the image, of the products being related to the pieces of product information.

11. The display control method according to supplementary note 9 or 10, in which the computer is a terminal carried by a customer, and includes the display unit, the display control method further including, performing by the computer:

image generation processing of generating the image; and image processing of processing the image and generating the shelf identification information.

12. The display control method according to supplementary note 11, in which the computer further includes at least one of the identification information storage unit and the product information storage unit.

13. The display control method performed by the computer according to supplementary note 9 or 10, in which in the shelf information acquisition processing, the shelf identification information is acquired from a terminal owned by a customer; and in the display control processing, the plurality of product information are output to the terminal.

14. The display control method performed by the computer according to any one of supplementary notes 9 to 13, in which in the display control processing, a display mode of the product information on the display unit is changed by use of information input by a customer in the store or information of the customer.

15. The display control method according to supplementary note 14, in which the display mode includes a size of a display region in which the product information is displayed, and a kind of language used for display of the product information.

16. The display control method performed by the computer according to any one of supplementary notes 9 to 15, in which the display unit is included in a terminal of a customer in the store, and in the display control processing, from among the plurality of pieces of product identification information acquired in the product identification information acquisition processing, at least one of the product identification information for which the product information should be highlighted, and the product identification information for which the product information is not displayed on the terminal is selected, by use of information input by the customer to the terminal or information of the customer.

17. A program causing a computer to include:

a shelf information acquisition function of acquiring shelf identification information which is information acquired by processing an image being generated by capturing an image of inside of a store and including a product shelf and which identifies the product shelf;

a product identification information acquisition function of being connectable to an identification information storage unit storing each of a plurality of pieces of the shelf identification information in association with pieces of product identification information of a plurality of kinds of products, and acquiring a plurality of pieces of the product identification information being related to the shelf identification information acquired in the shelf information acquisition function; and a display control function of being connectable to a product information storage unit storing each of a plurality of pieces of the product identification information in association with product information being information relating to the product being related to the product identification information, and performing processing for acquiring a plurality of pieces of the product information being related to the plurality of pieces of product identification information acquired in the product identification information acquisition function and causing a display unit to display the plurality of pieces of the product information.

18. The program according to supplementary note 17, in which the display control function, causes the display unit to display the plurality of pieces of product information together with the image, and sets display positions of the plurality of pieces of product information within the image by use of positions, within the image, of the products being related to the pieces of product information.

19. The program according to supplementary note 17 or 18, wherein the computer is a terminal carried by a customer, and includes the display unit, the program further causing the computer to include:

an image generation function of generating the image; and an image processing function of processing the image and generating the shelf identification information.

20. The program according to supplementary note 19, in which the computer further includes at least one of the identification information storage unit and the product information storage unit.

21. The program according to supplementary note 17 or 18, in which the shelf information acquisition function acquires the shelf identification information from a terminal owned by a customer, and the display control function outputs the plurality of product information to the terminal.

22. The program according to any one of supplementary notes 17 to 21, in which the display control function changes a display mode of the product information on the display unit, by use of information input by a customer in the store or information of the customer.

23. The program according to supplementary note 22, in which the display mode includes a size of a display region in which the product information is displayed, and a kind of language used for display of the product information.

24. The program according to any one of supplementary notes 17 to 23, in which the display unit is included in a terminal of a customer in the store, and the display control function selects, from among the plurality of pieces of product identification information acquired by the product identification information acquisition function, at least one of the product identification information for which the product information should be highlighted, and the product identification information for which the product information is not displayed on the terminal, by use of information input by the customer to the terminal or information of the customer.

REFERENCE SIGNS LIST

10 Display control apparatus
20 Store information management apparatus
40 Terminal
110 Image capturing unit
120 Image processing unit
122 Shelf information acquisition unit
130 Product identification information acquisition unit
140 Display control unit
150 Display unit
160 Identification information storage unit
170 Product information storage unit
180 Store information acquisition unit
190 Input unit
200 Customer information storage unit
410 Image capturing unit
420 Image processing unit
430 Transmission unit
440 Display control unit
450 Display unit
460 Input unit

What is claimed is:

1. A display control apparatus comprising:

at least one memory configured to store instructions; and at least one processor configured to execute the instructions to perform operations, the operations comprising:

acquiring shelf identification information which is information acquired by processing an image being generated by capturing an image of inside of a store and including a product shelf and which identifies the product shelf;

acquiring, from a first storage that stores each of a plurality of pieces of the shelf identification information in association with pieces of product identification information of a plurality of kinds of products, a plurality of pieces of the product identification information being related to the acquired shelf identification information; and performing processing for acquiring, from a second storage that stores each of a plurality of pieces of the product identification information in association with product information being information relating to the product being related to the product identification information, a plurality of pieces of the product information being related to the acquired plurality of pieces of product identification information, and causing a display to display the acquired plurality of pieces of the product information, wherein the operations further comprise:

identifying a position of each kind of product of the plurality of kinds of products in the image by using feature information for each product;

detecting a position of a shelf tag attachment portion of the product shelf from the image;

determining a display position for each of the plurality of pieces of product information based on the position identified for each kind of product and the position of the shelf tag attachment portion of the product shelf; and displaying the plurality of pieces of product information on the display based on the display position determined for each of the plurality of product information, wherein each of the plurality of pieces of product information is superimposed on the shelf tag attachment portion in the image as a form of a shelf tag.

2. The display control apparatus according to claim 1, wherein the display control apparatus is a terminal carried by a customer, and comprises the display, and wherein the operations by the terminal comprise:

generating the image; and processing the image to generate the shelf identification information.

3. The display control apparatus according to claim 2, further comprising at least one of the first storage and the second storage.

4. The display control apparatus according to claim 1, wherein the operations comprise:

acquiring the shelf identification information from a terminal owned by a customer; and outputting the plurality of pieces of product information to the terminal.

5. The display control apparatus according to claim 1, wherein the operations comprise changing a display mode of the product information on the display, by use of information input by a customer in the store or information of the customer.

6. The display control apparatus according to claim 5, wherein the display mode includes a size of a display region in which the product information is displayed, and a kind of language used for display of the product information.

7. The display control apparatus according to claim 1, wherein:

the display is included in a terminal of a customer in the store, and the operations comprise selecting, from among the acquired plurality of pieces of product identification information, at least one of the product identification information for which the product information should be highlighted, and the product identification information for which the product information is not displayed on the terminal, by use of information input by the customer to the terminal or information of the customer.

8. A display control method comprising, performing by a computer:

shelf information acquisition processing of acquiring shelf identification information which is information acquired by processing an image being generated by capturing an image of inside of a store and including a product shelf and which identifies the product shelf;

product identification information acquisition processing of acquiring, from a first storage that stores each of a plurality of pieces of the shelf identification information in association with pieces of product identification information of a plurality of kinds of products, a plurality of pieces of the product identification information being related to the shelf identification information acquired in the shelf information acquisition processing; and display control processing of performing processing for acquiring, from a second storage that stores each of a plurality of pieces of the product identification information in association with product information being information relating to the product being related to the product identification information, a plurality of pieces of the product information being related to the plurality of pieces of product identification information acquired in the product identification information acquisition processing, and causing a display to display the plurality of pieces of the product information, wherein the display control processing comprises:

identifying a position of each kind of product of the plurality of kinds of products in the image by using feature information for each product;

detecting a position of a shelf tag attachment portion of the product shelf from the image;

determining a display position for each of the plurality of pieces of product information based on the position identified for each kind of product and the position of the shelf tag attachment portion of the product shelf; and displaying the plurality of pieces of product information on the display based on the display position determined for each of the plurality of product information, wherein each of the plurality of pieces of product information is superimposed on the shelf tag attachment portion in the image as a form of a shelf tag.

9. The display control method according to claim 8, wherein:

the computer is a terminal carried by a customer, and comprises the display, and the display control method further comprising, performing by the computer:

image generation processing of generating the image; and image processing of processing the image to generate the shelf identification information.

10. The display control method according to claim 9, wherein the computer further comprises at least one of the first storage and the second storage.

11. The display control method performed by the computer according to claim 8, wherein:

in the shelf information acquisition processing, the shelf identification information is acquired from a terminal owned by a customer; and in the display control processing, the plurality of pieces of product information are output to the terminal.

12. The display control method performed by the computer according to claim 8, wherein in the display control processing, a display mode of the product information on the display is changed by use of information input by a customer in the store or information of the customer.

13. The display control method according to claim 12, wherein the display mode includes a size of a display region in which the product information is displayed, and a kind of language used for display of the product information.

14. The display control method performed by the computer according to claim 8, wherein:

the display is included in a terminal of a customer in the store, and in the display control processing, from among the plurality of pieces of product identification information acquired in the product identification information acquisition processing, at least one of the product identification information for which the product information should be highlighted, and the product identification information for which the product information is not displayed on the terminal is selected, by use of information input by the customer to the terminal or information of the customer.

15. A non-transitory computer-readable medium storing a program for causing a computer to perform operations, the operations comprising:

acquiring shelf identification information which is information acquired by processing an image being generated by capturing an image of inside of a store and including a product shelf and which identifies the product shelf;

acquiring, from a first storage that stores each of a plurality of pieces of the shelf identification information in association with pieces of product identification information of a plurality of kinds of products, a plurality of pieces of the product identification information being related to the acquired shelf identification information; and performing processing for acquiring, from a second storage that stores each of a plurality of pieces of the product identification information in association with product information being information relating to the product being related to the product identification information, a plurality of pieces of the product information being related to the acquired plurality of pieces of product identification and causing a display to display the plurality of pieces of the product information, wherein the operations comprise:

identifying a position of each kind of product of the plurality of kinds of products in the image by using feature information for each product;

detecting a position of a shelf tag attachment portion of the product shelf from the image;

determining a display position for each of the plurality of pieces of product information based on the position identified for each kind of product and the position of the shelf tag attachment portion of the product shelf; and displaying the plurality of pieces of product information on the display based on the display position determined for each of the plurality of product information, wherein each of the plurality of pieces of product information is superimposed on the shelf tag attachment portion in the image as a form of a shelf tag.

16. The non-transitory computer-readable medium according to claim 15, wherein:

the computer is a terminal carried by a customer, and comprises the display, and the operations by the terminal comprise:

generating the image; and processing the image to generate the shelf identification information.

17. The non-transitory computer-readable medium according to claim 16, wherein the computer further includes at least one of the first storage and the second storage.

* * * * *